US009432312B2

(12) United States Patent
Dasgupta et al.

(10) Patent No.: US 9,432,312 B2
(45) Date of Patent: Aug. 30, 2016

(54) PROACTIVE AND SELECTIVE TIME-STAMPING OF PACKET HEADERS BASED ON QUALITY OF SERVICE EXPERIENCE AND NODE LOCATION

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 13/934,929

(22) Filed: Jul. 3, 2013

(65) Prior Publication Data

US 2014/0219133 A1      Aug. 7, 2014

Related U.S. Application Data (60) Provisional application No. 61/761,107, filed on Feb. 5, 2013.

(51) Int. Cl.
*H04L 12/26* (2006.01)
*H04J 3/06* (2006.01)
*H04L 12/861* (2013.01)
*H04L 12/841* (2013.01)

(52) U.S. Cl.
CPC ........... *H04L 49/9057* (2013.01); *H04L 47/28* (2013.01)

(58) Field of Classification Search
USPC ........................................................ 370/254
See application file for complete search history.

(56) References Cited

U.S. PATENT DOCUMENTS

| 6,507,592 | B1 | 1/2003 | Hurvig et al. |
| 7,492,770 | B2 | 2/2009 | Senthilnathan et al. |
| 7,792,083 | B2 | 9/2010 | Bordonaro et al. |
| 7,860,125 | B2 | 12/2010 | Bains et al. |
| 2005/0123003 | A1* | 6/2005 | Bordonaro et al. .......... 370/516 |
| 2010/0177650 | A1* | 7/2010 | Wittgreffe ...................... 370/252 |
| 2013/0094366 | A1* | 4/2013 | Lee et al. ....................... 370/241 |
| 2013/0159548 | A1 | 6/2013 | Vasseur et al. |

OTHER PUBLICATIONS

Dasgupta, et al., "Proactive and Selective Time-Stamping of Packet Headers Based on Quality of Service Experience and Node Selection", U.S. Appl. No. 61/761,107, filed Feb. 5, 2013, 27 pages, U.S. Patent and Trademark Office.
Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron (57) ABSTRACT

In one embodiment, a message is received at a node in a network indicating that the node is classified as a critical node, and requesting the node to proactively time-stamp data packets. Data packets are received from one or more child nodes of the node, and the node selects a data packet of the received data packets to time-stamp. Then, the node proactively inserts a time-stamp in the selected data packet. The time-stamped data packet is sent toward a central management node.

16 Claims, 8 Drawing Sheets

BEHAVIOR IF ONE OF THE INTERMEDIATE NODES
MARK THE PACKET WITH A TIME STAMP PROBABILISTICALLY

BEHAVIOR IF ONE OF THE INTERMEDIATE NODES
MARK THE PACKET WITH A TIME STAMP PROBABILISTICALLY

FIG. 4A

BEHAVIOR IF ONE OF THE INTERMEDIATE NODES MARK THE PACKET.
THEN THE KEY NODE MARKS IT PROBABILISTICALLY

PROACTIVE AND SELECTIVE TIME-STAMPING OF PACKET HEADERS BASED ON QUALITY OF SERVICE EXPERIENCE AND NODE LOCATION

RELATED APPLICATION

The present invention claims priority to U.S. Provisional Application Ser. No. 61/761,107, filed Feb. 5, 2013, entitled "PROACTIVE AND SELECTIVE TIME-STAMPING OF PACKET HEADERS BASED ON QUALITY OF SERVICE EXPERIENCE AND NODE SELECTION", by Dasgupta, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to proactive and selective time-stamping of packet headers based on quality of service experience and node location. In one embodiment, a message is received at a node in a network indicating that the node is classified as a critical node, and requesting the node to proactively time-stamp data packets. Data packets are received from one or more child nodes of the node, and the node selects a data packet of the received data packets to time-stamp. Then, the node proactively inserts a time-stamp in the selected data packet. The time-stamped data packet is sent toward a central management node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
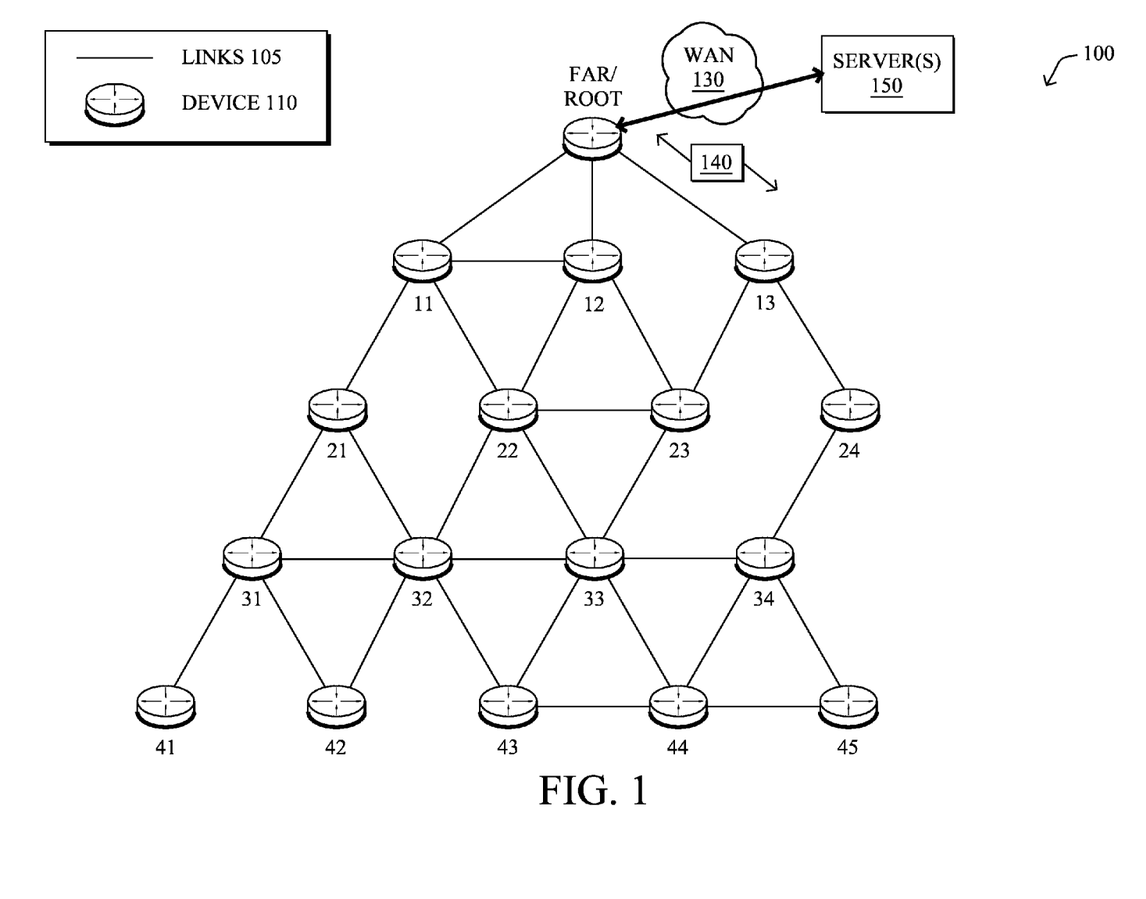
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
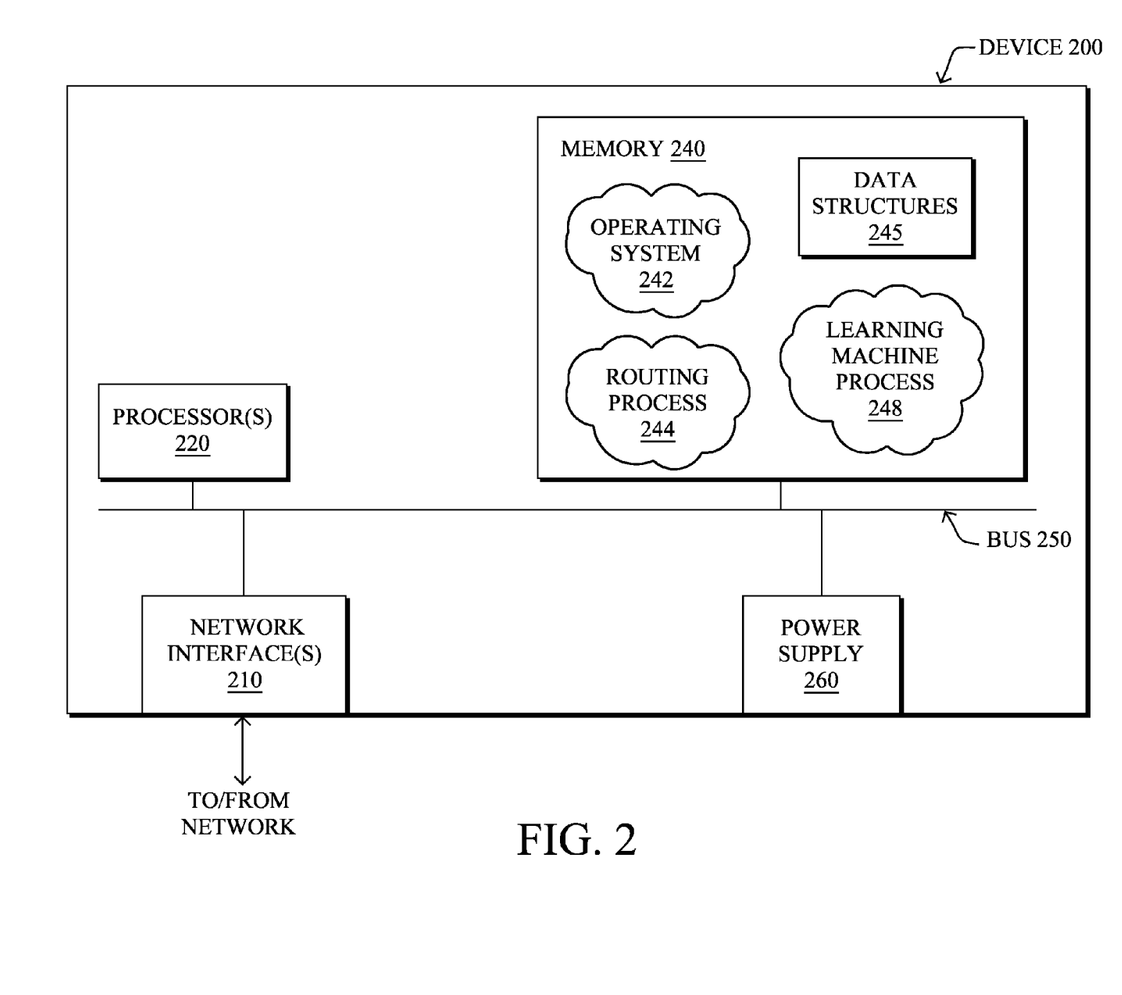
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
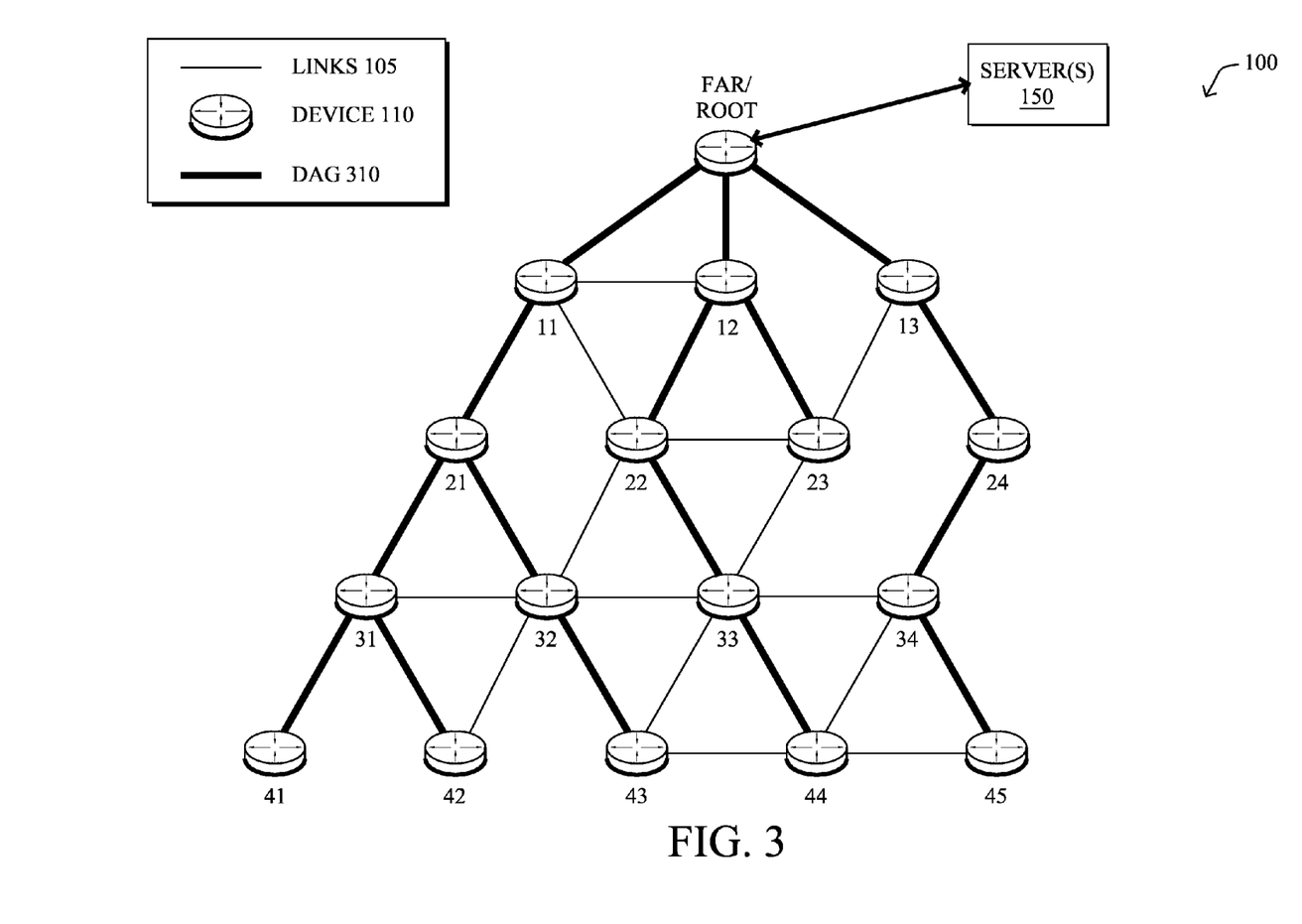
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

With the concept of distributed intelligence gaining tremendous traction (using for example a variety of Learning Machine based algorithms), there is a lack of several key elements in the architecture in current networks that would allow the deployment of these mechanisms rapidly. One of the key components of an intelligent mechanism relates to data gathering at the right place in the network. For example, a popular way to capture health of the network is to gather transit times of packets in the network. This allows one to figure out where there is degraded QoS within the network.

According to the techniques herein, nodes proactively time-stamp the packets that traverse through them, thus being proactive about determining when QoS starts to degrade. As time-stamping provides a significant overhead in terms of packet processing, an increased size of packets, and extended processing delay, node selection is key. The embodiments herein also propose several novel techniques to reduce overhead yet obtaining maximum results when the time-stamping mechanism is engaged. In particular, conventional techniques used in classic wired IP networks have functionality that cannot be easily extended to the LLN scenario. That is, because of the inherent characteristics of LLNs described above, being an "active" mechanism relies on packets being sent out and echoed back before any useful information can be gathered, which, in an LLN network with millions of nodes, would not scale and, on the contrary, would result in the further deterioration of the QoS. The techniques herein, therefore, move to a "proactive" solution where important nodes themselves will send information that will allow the gathering of important statistics. Further, contrary to current packet marking techniques, the techniques herein introduce a dynamic way of determining which nodes should be picked for packet marking, e.g., by configuring specific parameters at the root of the DAG. Also packet marking can be stopped herein as nodes can move from being important to not being important due to changes in network dynamics and built confidence by a learning machine.

Said differently, the techniques herein proactively time-stamp packets by critical nodes in the network. In one embodiment, a message is received at a node in a network indicating that the node is classified as a critical node, and requesting the node to proactively time-stamp data packets. Data packets are received from one or more child nodes of the node, and the node selects a data packet of the received data packets to time-stamp. Then, the node proactively inserts a time-stamp in the selected data packet. The time-stamped data packet is sent toward a central management node.

By doing this, QoS states across the whole PAN can be tracked actively without initiating probes or messages. Also, this allows one to proactively deploy remedies to fix issues that may be causing a drop in QoS. In particular, the techniques herein define clusters determine key nodes in the network that must use the time-stamping technique. In addition, the techniques herein select packets probabilistically based on their origination in a sub-DAG. This ensures that accurate and rich representation of all parts of the network is preserved. It also makes sure that processing overhead is distributed amongst all the nodes to provide a truly distributed solution such that no single node is taxed with the burden, and that time-stamped packets are coming from various locations related to their position in the network, using a "cascading" technique where requests to time-stamp are propagated to a specific depth in the network from the critical nodes. Furthermore, packet selection can be performed in two manners time-stamping: one based on the logical topology and the other based on the physical topology based on geographical areas.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

As mentioned above, time-stamping of packets is an effective way of determining the health of the network and the QoS (delay, jitter) experienced by the traffic. In traditional approaches deployed on classic networks, probes or special messages usually trigger time-stamping. This model, however, usually is not applicable to LLNs for multiple reasons:

a. By the time QoS has deteriorated, it may be too late to react as transmission and propagation delays have increased significantly by then; and b. Extra messaging only adds to network bandwidth usage further exacerbating the issues.

Operationally, the techniques herein first determine and communicate node "importance". In particular, not all nodes are equally important within a network. For instance, in a many networks, several nodes are leaves or exist in sparse areas and thus are less important in terms of their connectivity status and the QoS that they experience is less relevant to understand the overall network performance. On the other hand, several other nodes play very important roles and are key players in the overall connectivity and transit of traffic. Illustratively, the DAG root (FAR) or other management node or device, e.g., "central management device," determines these key nodes. As the FAR has the complete view, it uses a mechanism of pre-configured thresholds and metrics for this determination. Notably, an "important" node should be the parent of a sub-DAG that can be characterized as a cluster. For the purposes of the present disclosure, the cluster may alternatively be referred to as a "sub-network." A cluster is defined as a collection of nodes such that if the parent loses connectivity with the rest of the network, there is no alternate path for any node in its sub-DAG such that connectivity with the rest of the network can be established.

So, a cluster will be a disconnected tree in its own right. In one embodiment, the FAR can use a threshold such as selecting the set of key nodes N such that for each node $n_i$ the node is a cluster parent, the size of the cluster is more than 10% of the total size of the DAG and there is no node contained within this cluster that meets the previous two criteria (prevents selecting the same cluster twice). The node attribute may also be used (when recorded in the routing metric, or using the NMS agent) in order to mark a node as an important node (e.g., the node may be highly constrained and thus a potential source of issues in the network).

Once the set of nodes has been determined from above, the FAR sends a unicast IPv6 novel message to them notifying them of their importance (the list of important nodes may alternatively piggybacked in a routing update control message such as a RPL DIO message comprising the list of (compressed) important node IP addresses etc.). This message can contain specifics such as degree of importance, criticality in the network, etc. This info will be then used selectively on these end nodes when time-stamping is required. Likewise, as these networks are dynamic, the FAR may also send a message notifying that a node is no longer a key node when the topology has changed enough. In yet another embodiment, the FAR may indicate the predicted period of time during which the FAR considers the node as important. Optionally the message may also comprise a value D (depth), and a ratio R used in the algorithm below.

Figure 4A:
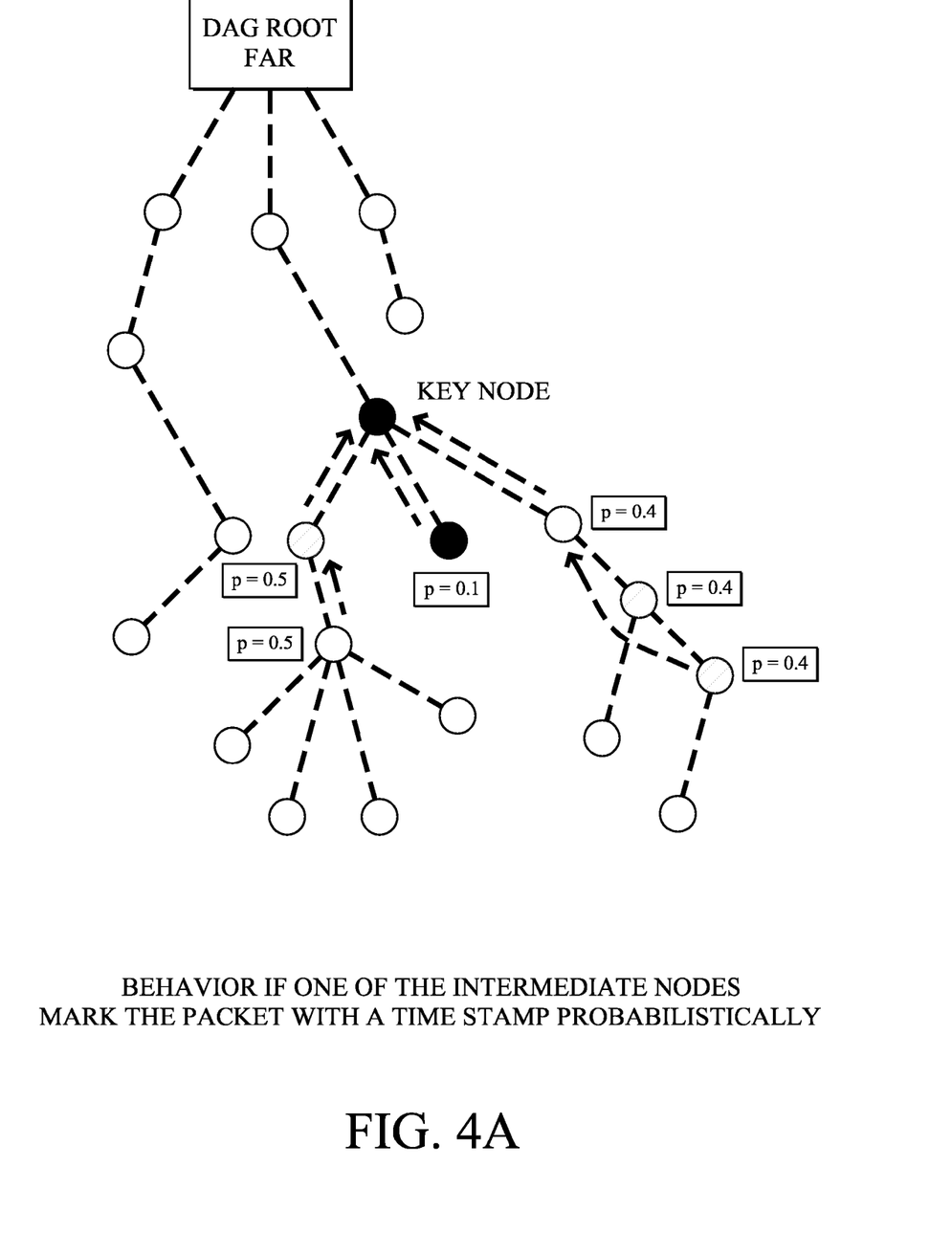
FIGS. 4A and 4B illustrate example behaviors of time-stamping packets.
Figure 4B:
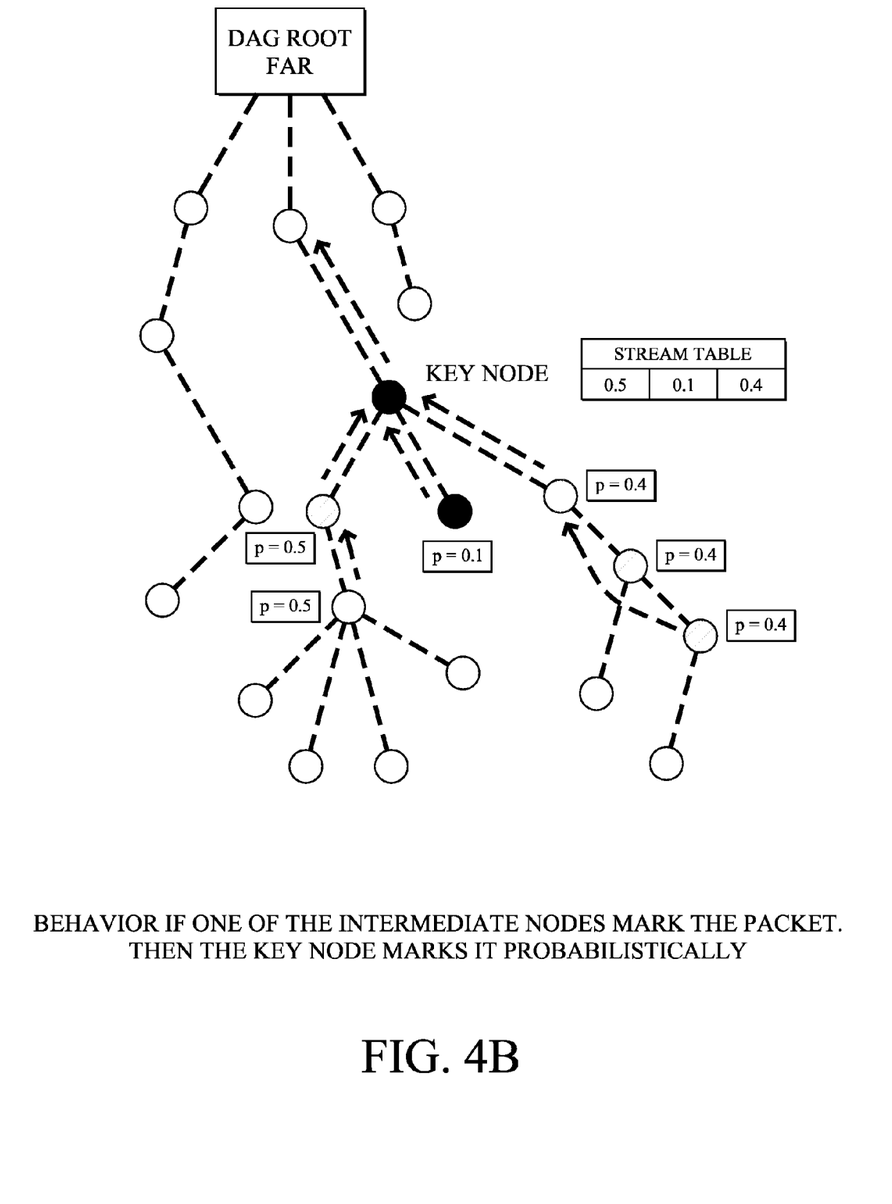

As shown in FIGS. 4A and 4B, the techniques also provide a proactive time-stamping algorithm with cascading time-stamping locations. In particular, once the key nodes have been notified of their importance using the messaging above, the nodes should start time-stamping the packets that are transiting them. That being said, this should be done intelligently as a lot of information can be obtained by stamping selectively, instead of stamping all packets, and when performed at the right place in the network. There are multiple aspects to this component:

a) Packet marking engine. This engine does the actual manipulation of the IP headers and inserts the time-stamps. This aspect is left for specific network implementation.

b) Stream selection mechanism and distributed selective time-stamping. As a cluster parent can have several children, it is important to sample the QoS of traffic coming from all the children (the traffic being marked at different locations as explained below), while keeping in mind the node would not mark every packet coming from them (sampling such that only R % of the packets are subject to time-stamping). Traffic coming from each of the children of the key node is referred to as a stream. This is irrespective of how deep the sub-DAG of the children is or what the actual source is. Then, the techniques herein proceed to select streams for marking when packets come in. To do so, the techniques deploy the following algorithm:

b-1) If D=0, then only the node receiving the receiving the notification that it is an important node will perform time-stamping of sampled streams.

b-1) If D<>0 then the node assigns a probability to all the children based on a criticality metric, which may include, for example, the weight of the sub-DAG of those children, geographical properties a type of service representation, and a type of data traffic. For example, if the key node has 3 children, each with 30 nodes in their sub-DAG, they may be assigned the probability of 0.33 each. If the sub-DAG size is 30, 15, and 5 for three children, then the probabilities may be 0.6, 0.3, and 0.1 respectively. This ensures proportional representation is given to packets originating from all parts of the network.

b-2) This probabilistic value is then shared with the children of the key node using a novel unicast IPv6 message, similar to above. Upon receiving the novel message, the value of D is decremented, and if D<>0, the nodes in turn then share this value with their children only if they are parents themselves. In this manner the leaves never receive this message. This way, specific probabilistic values propagate different sub-DAGs intrinsically notifying the node of their important lineage. This idea is illustrated for more clarity in FIGS. 4A and 4B.

b-3) Once the nodes have received their values, they start to time-stamp packets traversing through them with this probability and after applying a sampling ratio (since not all packets are time-stamped but only R %). The important aspect to keep in mind is, if a node upstream notices that packet has been time-stamped, it does not time-stamp it again. This is very efficient because at one point one packet is time-stamped only by one node. This truly distributes the overhead incurred by time-stamping and makes this approach lightweight. If an un-stamped packet reaches the key node, it then in turn may be time-stamped according to the probability R for the particular stream of packet. Furthermore, the FAR retrieves time-stamped packets from a variety of nodes in the network. FIGS. 4A and 4B illustrate this concept.

b-4) Several embodiments are possible. In one case, the node that time-stamps the packets can also add its information so there will be higher granularity of location. In another embodiment, the key node can also send a schedule with the probability values, so that all nodes can start and stop at prescribed times in the message thereby reducing the need to send another explicit message to stop time-stamping.

There are several advantages of time-stamping in this manner. First, no single node is always responsible for time-stamping, thus overhead is highly distributed. Second, since multiple nodes time-stamp, a richer set of data is obtained covering several positions in the logical as well as physical topology. Third, no packet is time-stamped twice. Fourth, leaves do not need to time-stamp since they are not in a critical position in the tree. Fifth, if the time-stamping is schedule based, the nodes can start this process without any explicit messaging, thereby reducing communication overhead. Lastly, the key node or some of its children could be a high powered device, allowing more processing and selective time-stamping simply by assigning higher probability to it.

Figure 5:
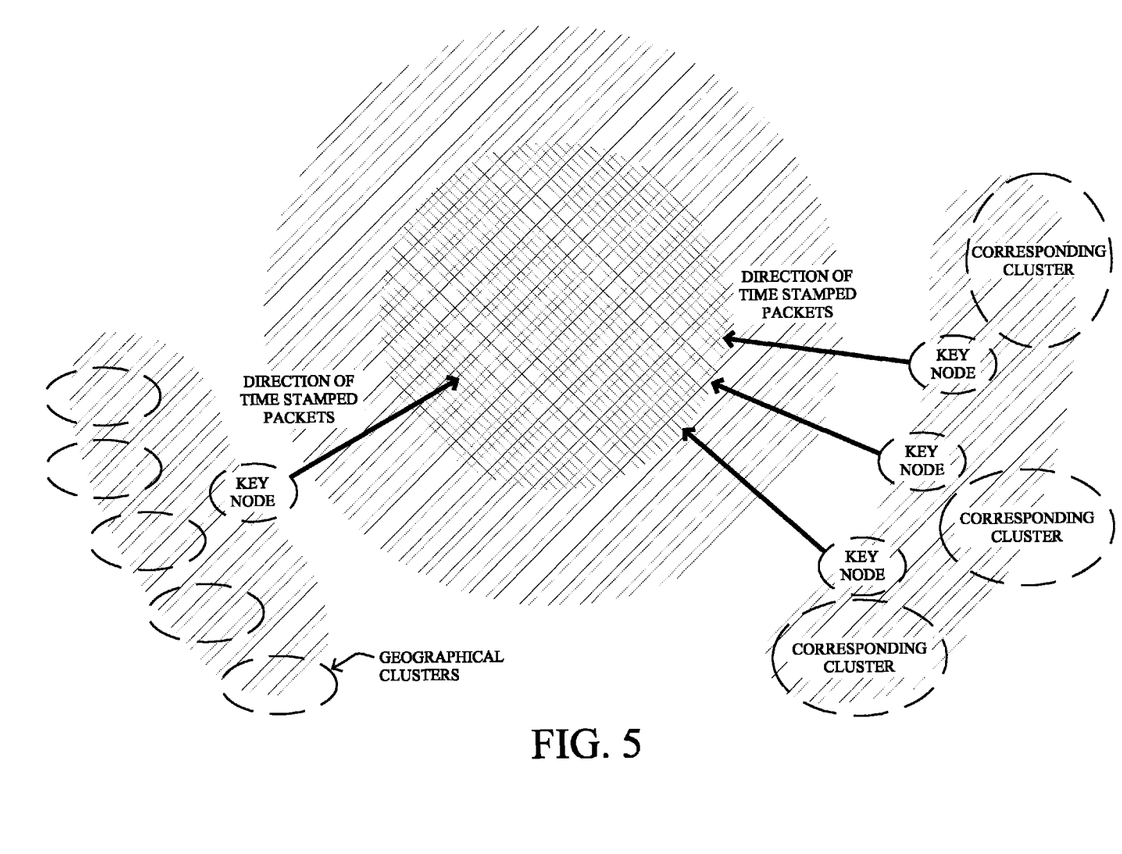
FIG. 5 illustrates an example of key nodes and node clusters.

FIG. 5 shows an illustration of the how the clusters can be divided based on the logical and geographical topologies. Regarding geographical correlation, sometimes a cluster might contain many directly connected children to the key node. In such a case, the techniques herein may segment the logical topology into geographical areas. This generally is performed because there can be strong correlation between environmental conditions and QoS and it is beneficial to capture all the characteristics. Here, similar to above, the techniques employ an algorithm:

I. Segment the children into geographical areas using their geo-coordinates evenly.

II. Assign probabilistic weights to geographical areas based on how many nodes are contained in them.

III. Based on the weights given to the areas, mark packets coming in from these areas. This ensures all geographical areas are represented proportionally.

Regarding time-stamp data analysis and tracking, once the FAR (or another dedicated centralized entity) starts to get time-stamped packets, it will start to keep track of them. As all the key nodes have already been identified, the time-stamps will be used to determine how the QoS is varying for the sub-DAGs. In one embodiment, a running average of the total traversal time will be maintained along with the min and max observed. As time goes on, new samples will continue to come in and they will be compared with existing averages, min and max values. This will be the quickest way to determine if something event, network or environmental is starting to cause a drop in QoS. If the FAR detects a highest variance in terms of delay/jitter it can then dynamically start adjusting the time-stamping frequency of the important node in order to more accurately determine if a QoS deterioration is confirmed and persistent, while still taking into account the overhead of time-stamping since increasing the time-stamping of packets would have an impact on the QoS itself.

Figure 6:
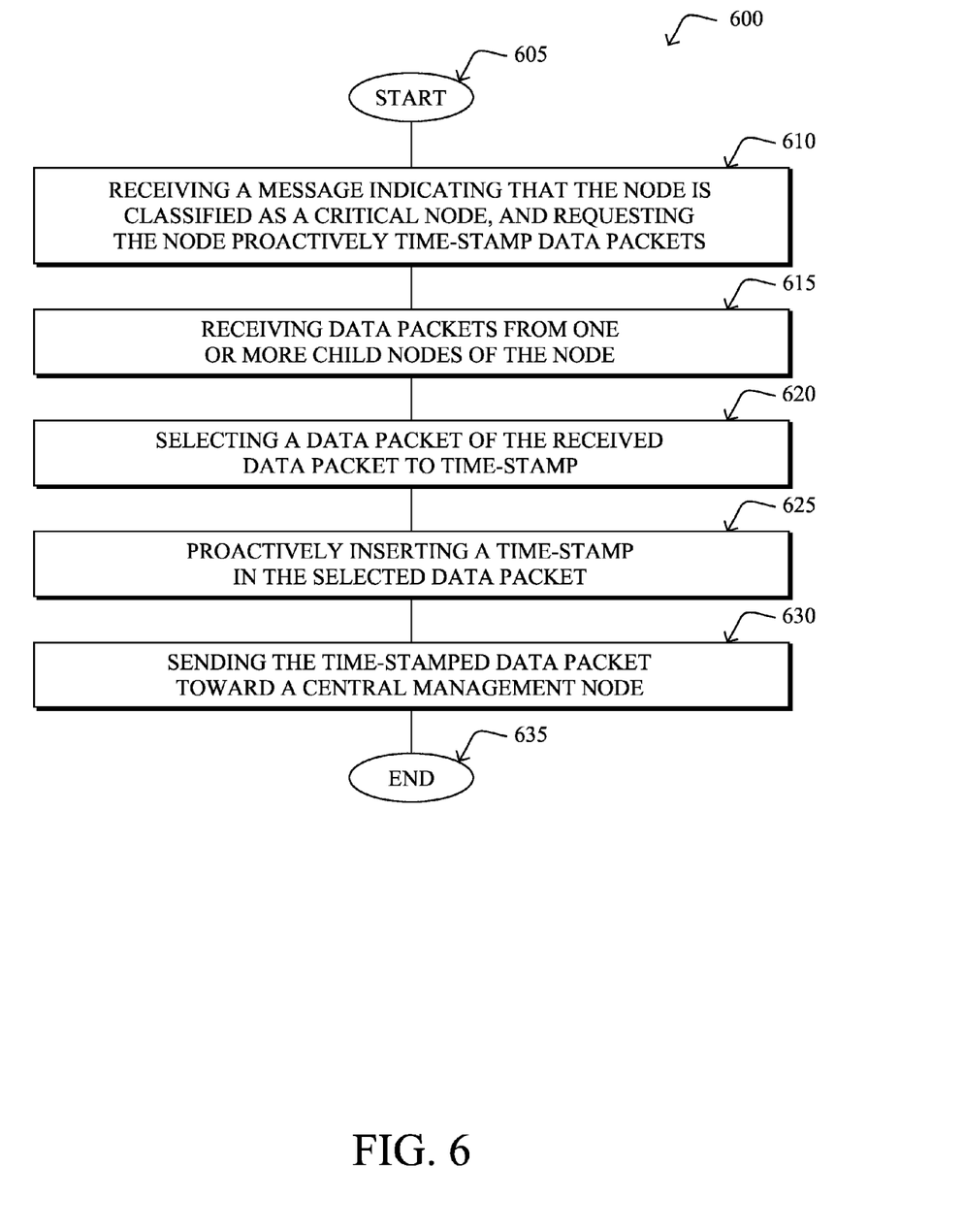
FIGS. 6 and 7 illustrate example simplified procedures for proactive and selective time-stamping of packet headers based on quality of service experience and node location.
Figure 7:
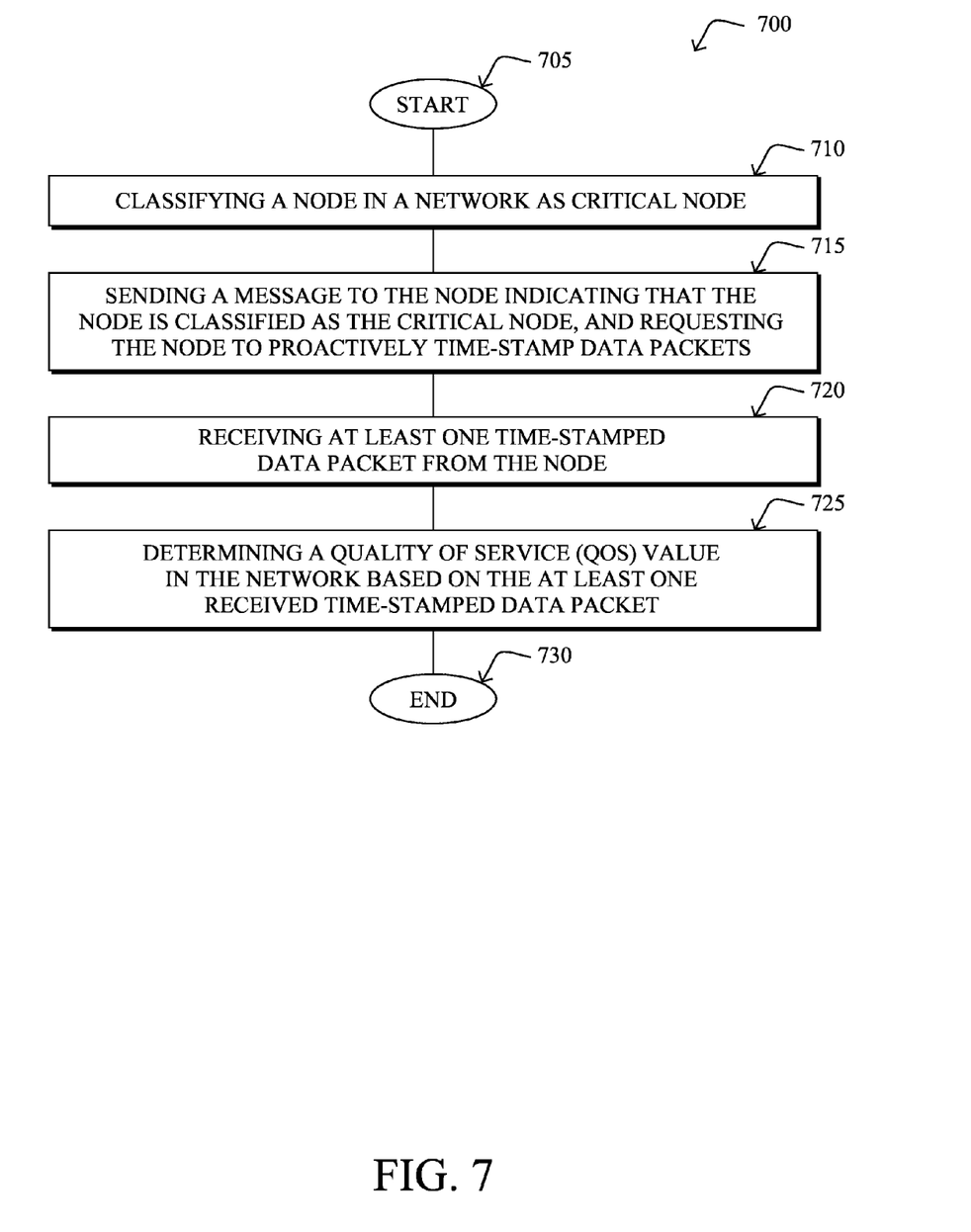

FIGS. 6 and 7 illustrate example simplified procedures for proactive and selective time-stamping of packet headers based on quality of service experience and node location. As shown in FIG. 6, the procedure 600 may start at step 605, continue to step 610, and so forth, where, as described in greater detail above, routing decisions are made based on a DNS-PBR protocol in a computer network.

At Step 610, the procedure 600 includes receiving a message indicating that the receiving node is classified as a critical node, and requesting the node to proactively time-stamp data packets. At Step 615, data packets are received from one or more child nodes of the node. At Step 620, a data packet of the received data packets is selected to time-stamp. At Step 625, a time-stamp is proactively inserted in the selected data packet. At Step 630, the time-stamped data packet is sent toward a central management node. The procedure 600 illustratively ends in step 635. The techniques by which the steps of procedure 600 are performed, as well as ancillary procedures and parameters, are described in detail above.

As shown in FIG. 7, the procedure 700 may start at step 705, continue to step 710, and so forth, where, as described in greater detail above, routing decisions are made based on a DNS-PBR protocol in a computer network.

At Step 710, the procedure 700 includes classifying a node in a network as a critical node. At Step 715, a message is sent to the node indicating that the node is classified as the critical node, and requesting the node to proactively time-stamp data packets. At Step 720, at least one time-stamped data packet is received from the node. At Step 725, a QoS value in the network is determined based on the at least one received time-stamped data packet. The procedure 700 illustratively ends in step 730. The techniques by which the steps of procedure 700 are performed, as well as ancillary procedures and parameters, are described in detail above.

It should be understood that the steps shown in FIGS. 6 and 7 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 600 and 700 are described separately, certain steps from each procedure may be incorporated into each other procedure, and the procedures are not meant to be mutually exclusive.

The techniques described herein, therefore, provide for proactive and selective time-stamping of packet headers based on quality of service experience and node location. In particular, in contrast to classical ways of packet marking being initiated as a reaction to some event, the techniques herein start marking packets proactively. In the LLN environment, resources could be too constrained to deploy a feedback-based mechanism quickly that will alleviate QoS issues rapidly. Accordingly, being proactive saves resources. Additionally, QoS and health status can now be tracked on a running basis and significant historical data can be maintained allowing quick detection. Furthermore, the techniques herein introduce a mechanism where packets from multiple areas are marked keeping in mind the appropriate degree of representation and importance. This takes into account both the logical topology as well as the geographical locations, thus allowing packet marking to be lightweight yet effective.

While there have been shown and described illustrative embodiments that provide for proactive and selective time-stamping of packet headers based on quality of service experience and node location, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node in a network, a first message indicating that the node is classified as a critical node, and requesting the node to proactively time-stamp data packets;
   receiving data packets from one or more child nodes of the node;
   selecting a data packet of the received data packets to time-stamp;
   proactively inserting a time-stamp in the selected data packet;
   sending the time-stamped data packet toward a central management node;

assigning a probability value to a child node of the node that is based on a criticality metric, wherein the selecting of the data packet is based on the assigned probability value; and sending a second message to the child node requesting the child node to proactively time-stamp data packets, wherein the second message propagates downwardly through the sub-network of the child node, and the time-stamp is inserted in the selected data packet only when the data packet has not already been time-stamped by another node.

2. The method according to claim 1, further comprising: including in the second message an indication of the assigned probability value.

3. The method according to claim 1, further comprising: receiving a third message indicating a cluster depth, wherein the second message propagates downwardly through the sub-network according to the cluster depth.

4. The method according to claim 1, further comprising: receiving a third message indicating a data packet selection ratio, wherein the selecting of the data packet is based on the data packet selection ratio.

5. A method, comprising:
classifying a node in a network as a critical node;
sending a message to the node indicating that the node is classified as the critical node, and requesting the node to proactively time-stamp data packets;
receiving at least one time-stamped data packet from the node;
determining a Quality of Service (QoS) value in the network based on the at least one received time-stamped data packet;
classifying a plurality of nodes in the network as critical nodes, wherein the node is one of the plurality of nodes; and
sending a message to each of the plurality of nodes requesting the plurality of nodes to proactively time-stamp data packets.

6. The method according to claim 5, further comprising: defining a cluster of nodes in the network, wherein the node is a parent node in the cluster of nodes.

7. The method according to claim 5, further comprising: including in the message an indication of one or more of: a period of time for which the node will be classified as the critical node, a degree of criticality of the node, a cluster depth, or a data packet selection ratio.

8. The method according to claim 5, wherein the classifying of the node is based on one or more of: a topology of the network, a location of the node, a threshold number of critical nodes, or a threshold size of a cluster of nodes.

9. An apparatus, comprising:
one or more network interfaces that communicate with a network;
a processor coupled to the one or more network interfaces and configured to execute a process; and
a memory configured to store program instructions which contain the process executable by the processor, the process comprising:
receiving, as a node in the network, a first message indicating that the node is classified as a critical node, and requesting the node to proactively time-stamp data packets;
receiving data packets from one or more child nodes of the node;
selecting a data packet of the received data packets to time-stamp;
proactively inserting a time-stamp in the selected data packet;
sending the time-stamped data packet toward a central management node;
assigning a probability value to a child node of the node that is based on a criticality metric, wherein the selecting of the data packet is based on the assigned probability value; and
sending a second message to the child node requesting the child node to proactively time-stamp data packets, wherein
the second message propagates downwardly through the sub-network of the child node, and
the time-stamp is inserted in the selected data packet only when the data packet has not already been time-stamped by another node.

10. The apparatus according to claim 9, wherein the process further comprises:
including in the second message an indication of the assigned probability value.

11. The apparatus according to claim 9, wherein the process further comprises:
receiving a third message indicating a cluster depth, wherein the second message propagates downwardly through the sub-network according to the cluster depth.

12. The apparatus according to claim 9, wherein the process further comprises:
receiving a third message indicating a data packet selection ratio, wherein the selecting of the data packet is based on the data packet selection ratio.

13. An apparatus, comprising:
one or more network interfaces that communicate with a network;
a processor coupled to the one or more network interfaces and configured to execute a process; and
a memory configured to store program instructions which contain the process executable by the processor, the process comprising:
classifying a node in the network as a critical node;
sending a message to the node indicating that the node is classified as the critical node, and requesting the node to proactively time-stamp data packets;
receiving at least one time-stamped data packet from the node;
determining a Quality of Service (QoS) value in the network based on the at least one received time-stamped data packet;
classifying a plurality of nodes in the network as critical nodes, wherein the node is one of the plurality of nodes; and
sending a message to each of the plurality of nodes requesting the plurality of nodes to proactively time-stamp data packets.

14. The apparatus according to claim 13, wherein the process further comprises:
defining a cluster of nodes in the network, wherein the node is a parent node in the cluster of nodes.

15. The apparatus according to claim 13, wherein the process further comprises:
including in the message an indication of one or more of: a period of time for which the node will be classified as the critical node, a degree of criticality of the node, a cluster depth, or a data packet selection ratio.

16. The apparatus according to claim 13, wherein the classifying of the node is based on one or more of: a topology of the network, a location of the node, a threshold number of critical nodes, or a threshold size of a cluster of nodes.

* * * * *